United States Patent
Znamenskiy et al.

(10) Patent No.: US 9,888,225 B2
(45) Date of Patent: Feb. 6, 2018

(54) METHOD OF RECORDING AN IMAGE AND OBTAINING 3D INFORMATION FROM THE IMAGE, CAMERA SYSTEM

(75) Inventors: Dmitry Nikolayevich Znamenskiy, Eindhoven (NL); Harold Agnes Wilhelmus Schmeitz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 251 days.

(21) Appl. No.: 13/981,959

(22) PCT Filed: Jan. 27, 2012

(86) PCT No.: PCT/IB2012/050384
§ 371 (c)(1),
(2), (4) Date: Jul. 26, 2013

(87) PCT Pub. No.: WO2012/104759
PCT Pub. Date: Aug. 9, 2012

(65) Prior Publication Data
US 2013/0307933 A1  Nov. 21, 2013

(30) Foreign Application Priority Data
Feb. 4, 2012 (EP) .................................. 11153377

(51) Int. Cl.
G01C 3/08 (2006.01)
H04N 13/02 (2006.01)

(52) U.S. Cl.
CPC ......... *H04N 13/02* (2013.01); *H04N 13/0235* (2013.01); *H04N 13/0253* (2013.01); *H04N 13/0271* (2013.01)

(58) Field of Classification Search
CPC ................................ G01C 3/08; G01S 15/002
See application file for complete search history.

(56) References Cited

U.S. PATENT DOCUMENTS 4,126,781 A * 11/1978 Siegel .................... G21K 1/087
250/281
4,591,253 A * 5/1986 Hecker .................. G02B 5/005
396/457

(Continued)

FOREIGN PATENT DOCUMENTS

CN          1971340 A     5/2007
CN          201707438 U   1/2011
(Continued)

OTHER PUBLICATIONS

Kutulakos, Kiriakos N., and Samuel W. Hasinoff. "Focal Stack Photography: High-Performance Photography with a Conventional Camera". MVA2009 IAPR Conference on Machine Vision Applications, May 20-22, 2009, Yokohama, Japan.*

Jongmin Baek, "Transfer efficiency and depth invariance in computational cameras" Computational Photography (ICCP), 2010 IEEE International Conference ON, IEEE, Piscataway, NJ USA, Mar. 29, 2010, pp. 1-8, XP031763028, ISBN: 978-1-4244-7022-8.

(Continued)

*Primary Examiner* — Luke Ratcliffe
*Assistant Examiner* — Samantha K Abraham (57) ABSTRACT

Two or more images are taken wherein during the image taking a focal sweep is performed. The exposure intensity is modulated during the focal sweep and done so differently for the images. This modulation provides for a watermarking of depth information in the images. The difference in exposure during the sweep watermarks the depth information differently in the images. By comparing the images a depth map for the images can be calculated. A camera system has a lens and a sensor and a means for performing a focal sweep and means for modulating the exposure intensity during the focal sweep. Modulating the exposure intensity can be done by modulating a light source or the focal sweep or modulating the transparency of a transparent medium in the light path.

18 Claims, 11 Drawing Sheets

(56) References Cited

U.S. PATENT DOCUMENTS

| | | | |
|---|---|---|---|
| 7,161,614 B1* | 1/2007 | Yamashita | H04N 13/026 348/42 |
| 2007/0147673 A1* | 6/2007 | Crandall | G02B 21/367 382/128 |
| 2007/0200927 A1 | 8/2007 | Krenik | |
| 2007/0296959 A1 | 12/2007 | Schwotzer | |
| 2008/0273027 A1* | 11/2008 | Feremans | H04N 13/0018 345/419 |
| 2009/0073259 A1* | 3/2009 | Hernandez et al. | 348/48 |
| 2010/0085470 A1* | 4/2010 | Tsubusaki | H04N 5/23212 348/345 |
| 2010/0128109 A1* | 5/2010 | Banks | G01S 7/4816 348/46 |
| 2011/0085024 A1* | 4/2011 | Ota | H04N 13/0011 348/43 |

FOREIGN PATENT DOCUMENTS

| | | | | |
|---|---|---|---|---|
| EP | 2151990 | A1 | 2/2010 | |
| JP | 2008523370 | A | 7/2008 | |
| WO | WO2006061347 | A1 | 6/2006 | |
| WO | WO 2008008152 | A2 * | 1/2008 | G06T 5/50 |
| WO | 2008120217 | A1 | 10/2008 | |
| WO | 2010131142 | A1 | 11/2010 | |
| WO | 2011083411 | A1 | 7/2011 | |
| WO | 2012127362 | A1 | 9/2012 | |

OTHER PUBLICATIONS

Deokhwa Hong et al, "Depth-of-field extension through focal plane oscillation and variable annular pupil", Optomechatronic Technologies, 2010 International Symposium ON, IEEE, Piscataway, NJ USA, Oct. 25, 2010, pp. 1-6, XP031849034, ISBN: 978-1-4244-7684-8.

Kuthirummal S., et al, "Flexible Depth of Field Photography", IEEE Transactions on Pattern Analysis and Machine Intelligence, IEEE Service Center, Los Alamitos, CA, US, vol. 33, No. 1, Jan. 1, 2011, pp. 58-71, XP011373495, ISSN: 0162-8828, DOI: 10.1109/TPAMI.2010.66.

Ringbeck et al, "A 3D Time of Flight Camer for Object Detection", Optical 3-D Measurement Techniques, vol. 9, 2007, 10 Pages.

Levin et al: "Image and Depth From a Conventional Camera"; ACM Transactions on Graphics, vol. 26, No. 3, Article 70, Jul. 2007, pp. 70-1-70-09.

Vlutters et al: "Low-Cost Depth Estimation"; Philips Researchtechnical Note PR-TN 200910622; Nov. 2009, 94 Page Document.

Schmeitz et al: "Sweeping Focus Camera"; Philips Research Technical Note PR-TN 2009100745, Dec. 2009, 64 Page Document.

"Time-of-Flight Camera"; article from Wikipedia, Oct. 2009, 9 page article.

Ye et al: "Liquid Crystal Lens With Electrically Controllable Focal Length"; Proceedings of the 2011 IEEE International Conference on Mechatronics and Automation, Aug. 2011, pp. 635-639.

* cited by examiner

METHOD OF RECORDING AN IMAGE AND OBTAINING 3D INFORMATION FROM THE IMAGE, CAMERA SYSTEM

CROSS-REFERENCE TO PRIOR APPLICATIONS

This application is the U.S. National Phase application under 35 U.S.C. § 371 of International Application No. PCT/IB2012/050384, filed on Jan. 27, 2012, which claims the benefit of European Patent Application No. 11153377.4, filed on Feb. 4, 2011. These applications are hereby incorporated by reference herein.

FIELD OF THE INVENTION

The invention relates to a method for recording an image and to a method for obtaining 3D information from the image. The invention also relates to a camera system.

BACKGROUND OF THE INVENTION

One of the hot topics in modern day imaging techniques is 3D imaging.

The most straightforward way of obtaining 3D images is by means of taking two or more images from different viewpoints and constructing from the two or more images a 3D image. Such techniques basically mimic the human vision system.

The disadvantage of such techniques is that one needs two cameras and one needs to know the distance between the two cameras, their focal lengths and the lens distortions, and combine the images taken to produce 3D information.

There is a need for imaging techniques that allow 3D information to be obtained using a single camera, or at least a single lens.

A number of methods are known which use only a single camera, or a camera assisted with a static pattern projector. The methods can be divided in three groups: triangulation based, de-focus based and time-of-flight.

In triangulation based methods the depth is estimated from the local disparities between a projected pattern and an acquired pattern, i.e. the image the projected pattern gives on the objects in the images. The distortions of such patterns provide for an estimate of the distance. The disadvantage is that a pattern is to be projected and that at best an estimate is made that provides for some sort of indirect estimate providing a probabilistic estimate, not a real estimate.

In depth-of-focus methods a camera is focused at a certain distance, and the depth map can be estimated by computing locally an amount of de-focus caused by deviations of the actual distances to the object from the distance of perfect focus. Again a probabilistic estimate is provided and in principle there is a duality in the outcome since there is no way of distinguishing with any certainty whether the out-of-depth focus is due to an object being in front of or further away than the plane of focus.

In contrast to this, time-of-flight methods do provide a realistic estimate of the distance to the camera. In 'time of flight' methods the object is illuminated with 5-50 ns light pulses. The special camera sensor then measures the delay between the emitted and reflected pulses which grows with the distance to the object. An example of such a camera system is described in "A 3-D time of flight camera for object detection" by Ringbeck et al, Optical 3D measurement techniques Sep.-Dec. 7, 2007 ETH, plenary session 1: Range Imaging 1. However the method requires sophisticated techniques and is not suited for all distances, the range is typically a few meters to 60 meters, small distances are difficult to measure.

SUMMARY OF THE INVENTION

Therefore there is a need for an alternative method for recording an image and obtaining 3D information.

To this end the method of the invention is characterized in that first and second image data are taken in which during the image taking a focal sweep is made over a focal range, whereby the exposure intensity is, during the focal sweep, differently modulated for the first and second image.

The exposure is the amount of light that is captured per shot. Modulating the exposure intensity during the focal sweep has as a consequence that, since the position of best focus corresponds to the maximal concentration of spatial high frequencies, the spatial high frequencies are modulated with the actual object-camera distance. Therefore, the depth information is watermarked in high-frequencies of the acquired image. By differently modulating, the depth information is watermarked differently in both images. By comparing the high-frequency information, the depth information is obtainable, and a 3D depth map can be calculated.

For one of the images the exposure may be non-modulated. The difference in modulating would then be that one of the images has a modulated exposure whereas the other has not.

Preferably, however, the exposure in both images is modulated in such manner that the modulation in one image is reversed with respect to the modulation in the other image. E.g. in one image the modulation is from high to low exposure going from a near focus to a distant focus, while in the other image it is the reverse.

This allows accurate 3D information to be obtained.

In embodiments the sum of the exposure for both images is a constant.

Modulation of the exposure intensity can be performed in various ways:

The light captured from a scene can be modulated, by modulating the intensity of a light source.

The light captured can be modulated by a time modulated dimmer in front of the lens or in front of a sensor of the camera.

The first and second image can be taken simultaneously as well as consecutively.

More than two images can be taken. This may be interesting in those circumstances where there is relatively little light and noise reduction is important.

The method for providing images provided the raw data i.e. the two images from which 3D information can be calculated.

The invention is also embodied in a method of obtaining 3D information from the images taken by any of the above mentioned methods of recording images, by comparing the high-frequency information in the first and second image, and calculate depth information from such comparison.

The two methods, the method for providing images and the method for obtaining 3D image information can be integrated into a single method, but the method for obtaining image information itself also provides for an embodiment of an aspect the invention.

It provides the data from which the 3D image information is obtained. It provides for a set of images obtained in a manner that is unknown from the prior art.

The preparation stage, i.e. the taking of the first and second image can for instance be taken at one position by a camera, stored on a storage medium inside the camera. The image data is later transferred to a central processing unit which analyses the data and obtains the 3D information. The image data can also be directly transferred, for instance wireless via the internet, to a central processing unit, which can be associated with a site, in which central processing unit, located in another country, the 3D information is obtained. So both methods, the method for providing the images and the method for obtaining 3D information from the images taken are aspects of the invention.

The invention is also embodied in a camera system wherein the camera system comprises a lens and a sensor and means to perform a focal sweep, wherein the camera system comprises means to modulate the exposure intensity during the focal sweep.

These and further aspects of the invention will be explained in greater detail by way of example and with reference to the accompanying drawings, in which

DETAILED DESCRIPTION OF THE DRAWINGS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention provides a novel concept of range image computation from two shots of a sweeping focus camera. The sweeping focus camera is a camera which changes the focusing distance during the image acquisition. This can be done either by translation of the sensor or the lens along the optical axis, as shown on FIG. 1 for a translation of the sensor, or by changing the lens focal number as shown on FIG. 2.

Figure 1:
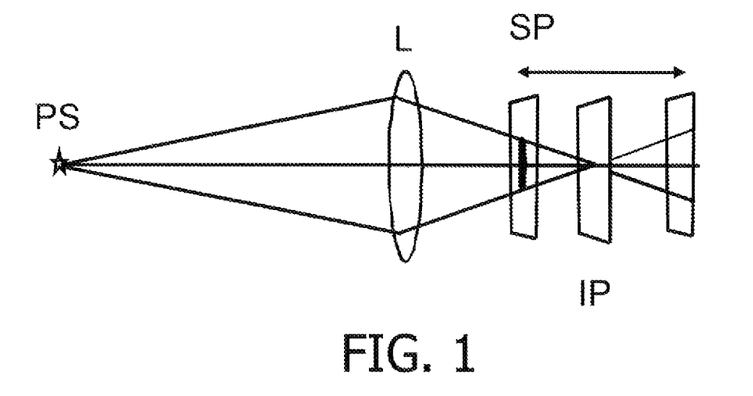
FIG. 1 illustrates a sweeping focus via changing the distance between the sensor and the lens.

FIG. 1 illustrates a sweeping focus by changing the distance between the sensor S and the lens L. The sensor is moved from a position in front of the image plane to a position behind the image plane, thus sweeping through the Image Plane IP. Of course, instead of moving the sensor as shown in FIG. 1, one can also move the lens L.

Figure 2:
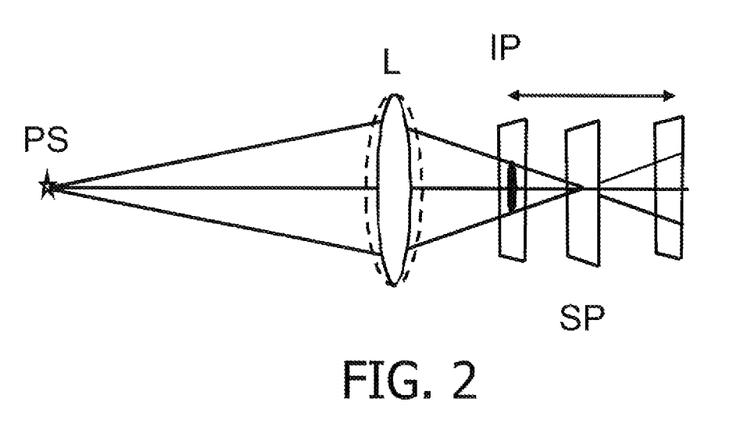
FIG. 2 illustrates sweeping focus via changing the focal length of the lens L.

FIG. 2 illustrates sweeping focus via changing the focal length of the lens L, the sensor plane SP stays at one position but, by changing the focal length of the lens L the image plane is moved from a position in front of to a position behind the sensor plane. IP stands for the image plane. PS stands for the position of the object. Please note that a focal sweep also corresponds to a sweep in the position of objects that are in focus at positions in front of the lens and there is a one-on-one relation between the two.

In traditional imaging, the position of the sensor is fixed so that only the objects at certain nominal distance appear sharply on the sensor. Objects at other distances will appear de-focused on the sensor, where the amount of de-focus blur is proportional to the distance between the sensor and the nominal image plane.

In a 'sweeping focus' camera, the sensor plane sweeps through a range of image planes during the exposure (FIG. 1) or alternatively the image plane sweeps through a range of positions around the sensor plane (FIG. 2).

In contrast to a traditional camera there is no single distance to the camera at which an object appears sharply in focus on the sensor. Instead, the captured images are always blurred.

Figure 3:
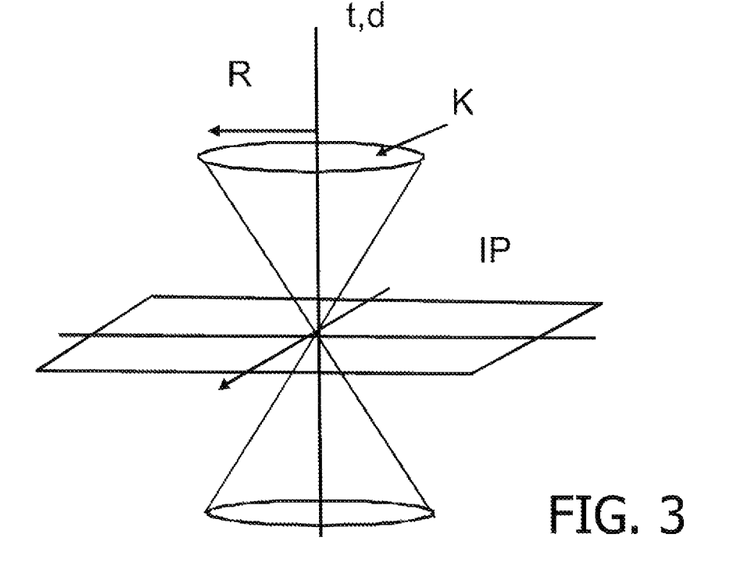
FIG. 3 illustrates a blurring kernel as the sensor plane sweeps through the image plane wherein the image plane is situated in the middle of the sweep range.
Figure 4:
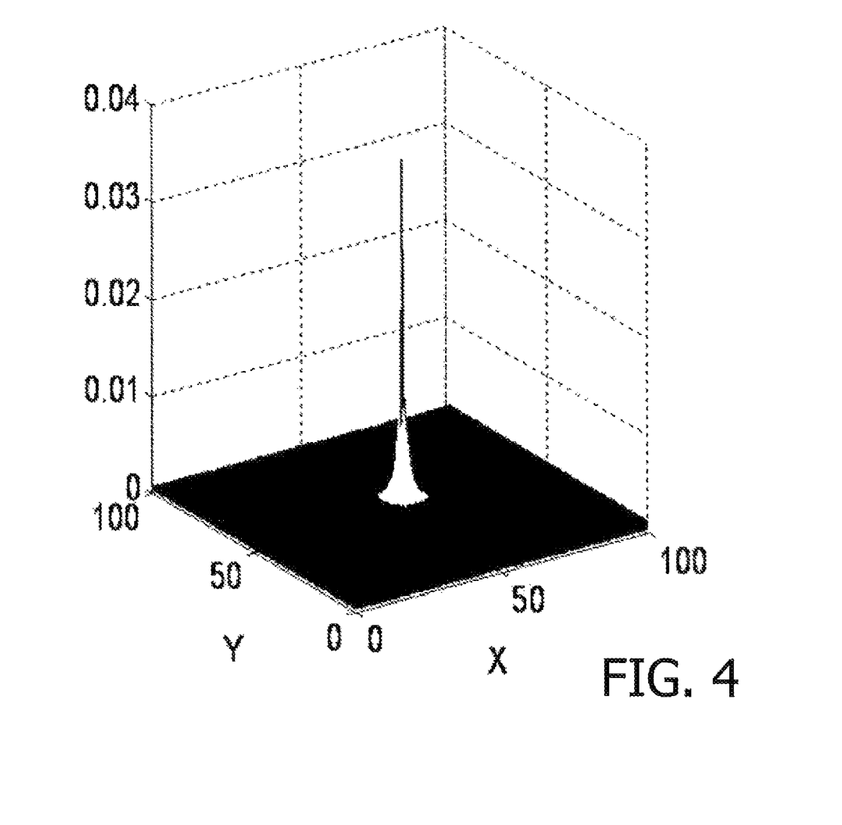
FIG. 4 illustrates the effective system blurring kernel for FIG. 3.

In both implementations, the sensor sweeps through the image plane where the object is perfectly in focus. Thus, the object stays in focus only one instant of time and for the remaining acquisition time it is more or less defocused. The amount of de-focus is directly proportional to the distance between the sensor and the image plane. Instant blurring can be represented as a convolution of the sharp image with a uniform kernel that has the shape of the lens aperture, which in most cases has a geometry close to disk geometry. When the sensor sweeps through the image plane, the blur kernel is scaled spatially. The radius of the kernel first decreases to (virtually) zero, at the position where the sensor plane and the image plane coincide, and then increases again. In the following a linear focus sweep is considered wherein the radius R of the blurring kernel K changes linearly with time t and where the starting and the ending blurring radiuses are equal. This is illustrated in FIG. 3. By looking at FIG. 3 one can find the blurring diagram has the shape of two cones pointing towards the image plane. As stated before a sweep in time corresponds to a sweep through positions in front of the lens, i.e. through the focal sweep range, therefore the vertical axis is given as t (time) as well as d (position in focal sweep range). The total blurring which the system produces on the sensor is a temporal integral over the disk kernels with linearly increasing radiuses. An illustration of this system kernel is given in FIG. 4 showing the effective system blurring kernel. One can see that the shape of the system kernel is in-between the Dirac delta, corresponding to the sharply focused image, and the flat disk de-focus kernel of the traditional camera. The vertical axis is the intensity of the blur kernel, the x and y axis denote in arbitrary units the extent of the blur kernel in an x and y direction.

As an example the following set-up can be described:

Consider a system with a moving sensor where the lens has focal length f=12 mm, and F-number F=1.4 which gives a=f/(2*F)=12/(1.4*2) is approximately 4.3 mm aperture radius. Suppose that the sweeping focus range is 250-750 mm from the lens.

Since the object at distance x from the lens is sharply focused at distance y=fx/(x−f) behind the lens, we compute that the sweeping focus range corresponds to the range 12.6-12.2 mm of the sensor-lens distances. For 10 ms exposure time the sweeping speed should be (12.6−12.2)/0.01=40 mm/s. For an object image at the middle of the sweeping distance, (i.e. at 12.4 mm behind the lens), the maximal blurring radius (for the focusing at the beginning of the sweeping interval) will be (12.4−12.2)*a/12.2=0.0705 mm or 11.7 pixels on the sensor with 6 µm pixels and twice as much for pixels half the size. Of course for larger sweep ranges the kernel size will change.

For a traditional camera, the amount of de-focus increases linearly with the distance to the image plane. Objects at one particular distance to the camera will be sharply imaged, but as the objects are further away or closer to the camera the blurring increases. Below we will show that the amount of blur in the sweeping focus camera design is much less sensitive to the variations in the object-camera distance, or in other words the blur is more or less the same for any object, whatever its distance from the lens.

Figure 5:
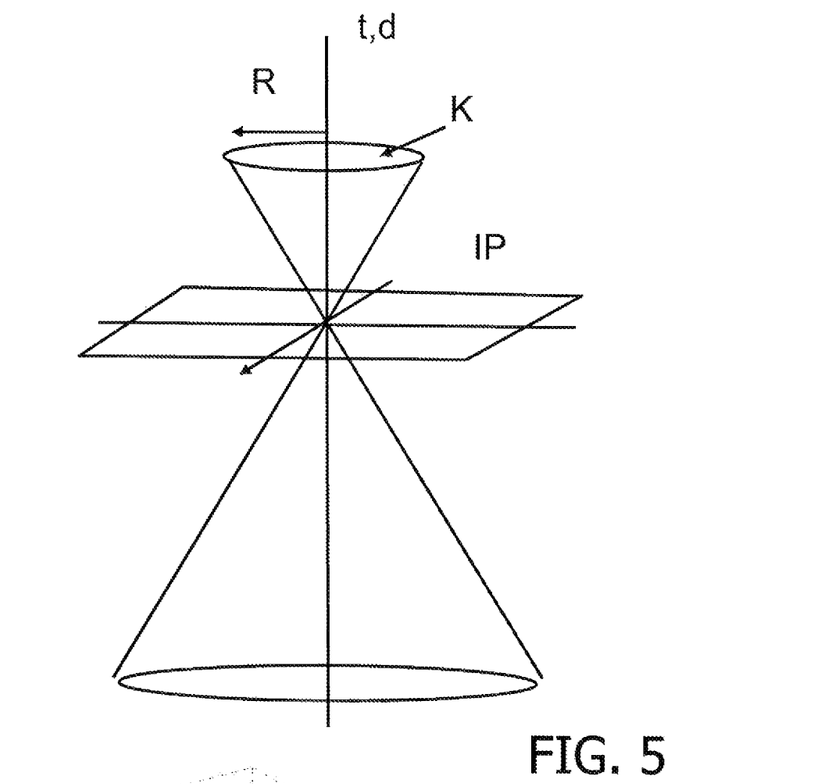
FIG. 5 illustrates a blurring kernel as the sensor plane sweeps through the image plane wherein the image plane is situated near one end of the sweep range.
Figure 6:
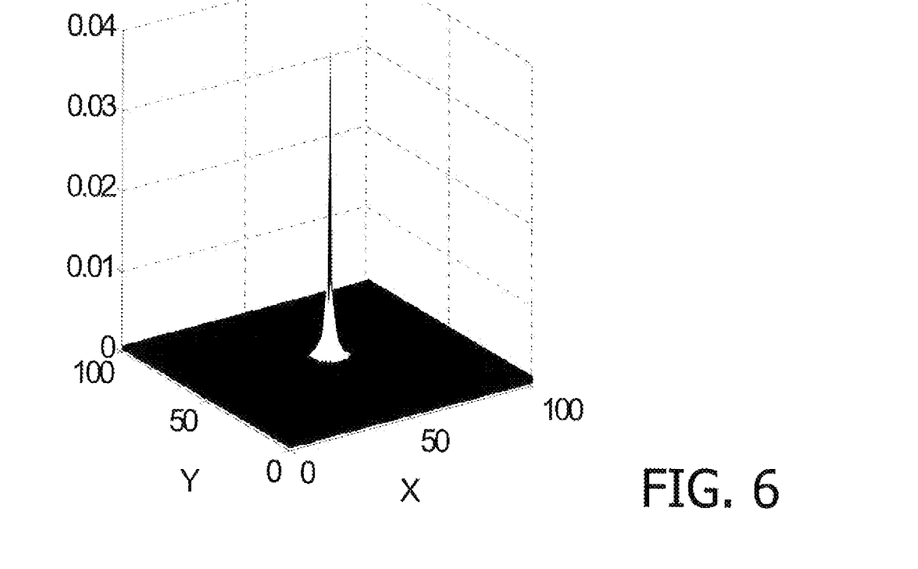
FIG. 6 illustrates the effective system blurring kernel for FIG. 5.

Consider the case when the distance to the object is different from the nominal but it is still covered by the sweeping range (i.e. the camera crosses through the objects image plane during the sweep, albeit not precisely half-way, but the image plane is near one end of the focal sweep). This will lead to a temporal offset of the moment when the sensor will cross the actual image plane. Thus the shape of the dual-cone blurring diagram around the actual image plane will stay the same, but the starting and the ending blurring radiuses will be different, see FIG. 5. FIG. 6 is similar to FIG. 5 above showing the system kernel.

The system kernel as illustrated in FIGS. 4 and 6 is the blurred image provided by a point source, thus function is also called the point spread function, i.e. how a point is spread out over the compound image.

We see that each object, regardless its distance to the camera, as long as the position of the object lies within the range corresponding to the focal sweep, will appear at certain moment of time sharply focused and moreover, around this time, it will experience the same blurring effect. Note that the energy of the blurring kernels for each moment in time is constant. When the object is close to its image plane, the filter energy is highly concentrated such that the moment of a sharp focus corresponds to a Dirac delta kernel. This part of the spatio-temporal integration area dominates the outcome of the temporal integral. Hence the object is blurred similarly on the sensor, almost irrespective of its distance to the camera.

One of the greatest advantages of the sweeping focus kernel is that its response has no 'zeros' in the frequency response such that its inverse operation exists for all spatial frequencies, the sweeping kernel thus allowing a well-defined and compact inverse filter. For a standard kernel this is not possible. This allows making an image that is in focus all over the sweep range.

However, one cannot with any accuracy estimate depth from an almost depth-invariant blurring kernel from a single sweep. In fact the sweeping focus approach is first and foremost developed to provide the possibility to extract from the image an image that is in focus at every depth. Thus, using a sweeping focus camera does not seem to offer much hope of obtaining reliable depth information, since it is in fact a goal that is opposite to the very basic reason for using a sweeping focus approach.

However, the inventors have realized that by modulating the exposure during the focal sweep it is possible to use the focal sweep approach to watermark the high frequency in the acquired image. By differently modulating the exposure intensity in two images taken with a sweeping focus camera it is possible to abstract depth information. Yet an all-in focus image is still also possible to reconstruct. So the best of two worlds can be achieved, an image that is in focus at all distances can be made, and, in addition, depth information at all distances within the focal sweep distances can be obtained.

The modulated exposure can be implemented in a number of different ways of which as examples the following may be given:

1) using an exponential or constant acceleration instead of constant speed focal sweep (the focusing distance changing as exponential function of time), for an exponential acceleration focal sweep speed increases and decreases exponentially as function of time, for a constant acceleration the focal sweep increases and decreases linearly with time.

2) by modulating the aperture along with the focal sweep of constant sweep speed, 3) by modulating the ambient illumination along with the focal sweep of constant sweep speed 4) by modulating the transmission of light along with the focal sweep of constant sweep speed.

5) any combination of the above

Below we describe a number of embodiments for the camera system, and an embodiment for the extraction of the depth map.

In all embodiments the image brightness i.e. exposure per focus position is modified—either directly by controlling the light source or shutter, or by changing the time the system is focused on a position. The brightness may also be modulated in a limited set of wavelengths (watermarking in colour).

Figure 7:
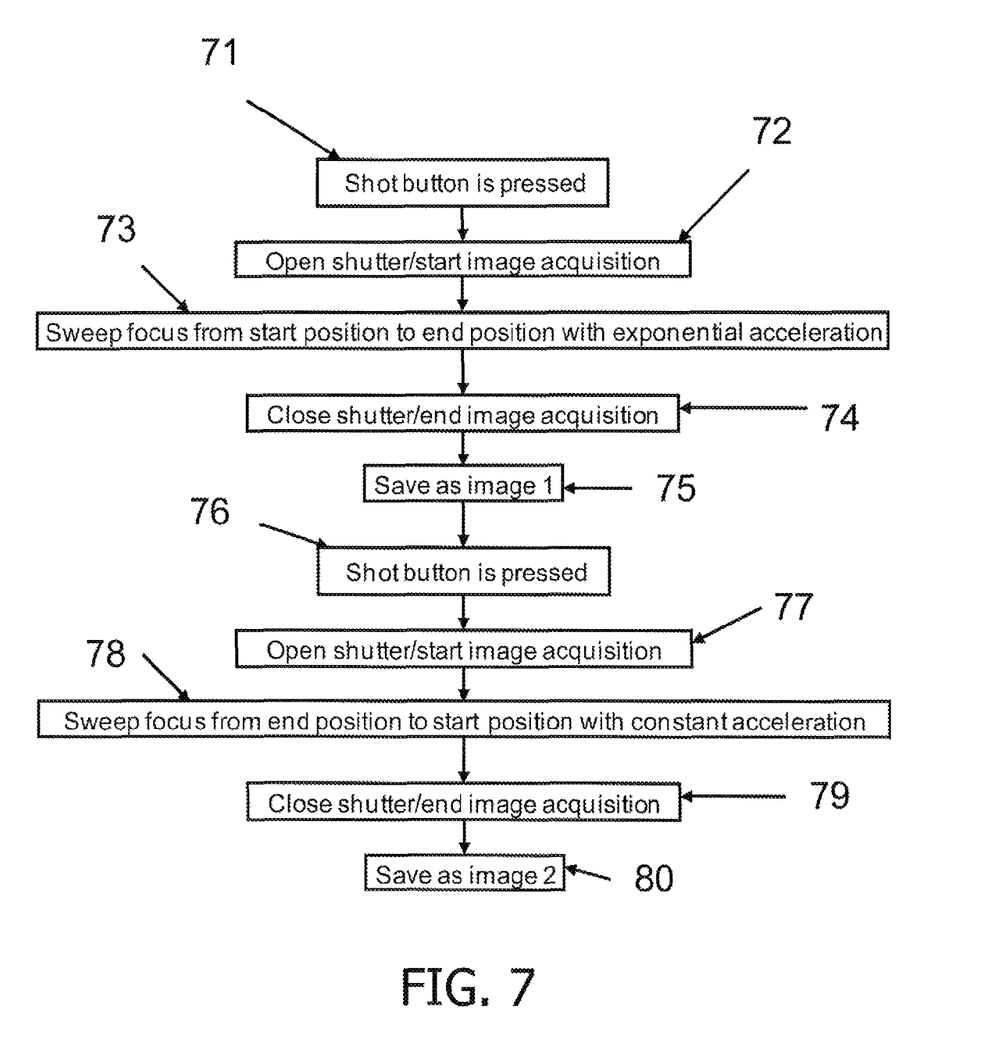
FIG. 7 illustrates acquiring two images with differently modulated exposure intensity.

FIG. 7 illustrates taking two images. In steps 71, 72 the acquisition of the first image is started. In FIG. 1 this is done by pressing the shutter button. Of course other means than pressing a button can be used to initiate the acquisition process. For instance the detection of movement for taking the image of an animal in the wild, or the detection of a car speeding for taking images of tracking violation may initiate the acquisition. In step 73 the focus is swept in or the acquisition of image 1 from beginning to end of the sweep with an exponential acceleration. An exponential acceleration will lead to a sweep speed that is exponentially increasing from some value to an end value over the sweep. The system will then spend, during the exposure, most of its time near the beginning of the focal sweep, where the sweep speed is small. However, it is not simply a reproduction of FIG. 5, since actually the time scale t, d is altered. The image acquisition is ended (step 74) and the image is saved (step 75). The same procedure is repeated in a mirror facing (i.e. by sweeping the focus from end to start position with exponential acceleration) in steps 76 to 80. The system will spend, during the second part of the process, most of its time near the end of the focal sweep, where, in acquiring image 2, the sweep speed is small. Two images are so acquired. In this example an exponential acceleration is used, in other examples a constant acceleration may be used.

Thus, during the acquiring of images 1 and 2 the exposure is modulated, for one image the most of the exposure is done before crossing the image plane, in the other it is the other way around. In this example the focal sweep is done with an exponential acceleration. This will lead to a sweep speed that is not constant but varies in an exponential manner with time. Of course the sweep speed may also be a different function of time. One such variation is to use a constant acceleration of the sweep speed, in that case the sweep speed increases and decreases linearly with time. Preferably, in whatever variation, the sweep speed increases from one end to the other end of a sweep for one image and the reverse for the other.

An alternative for controlling the sweep speed is to use a set-up in which a constant sweep speed is used for taking both images, but in which the illumination is different.

Figure 8:
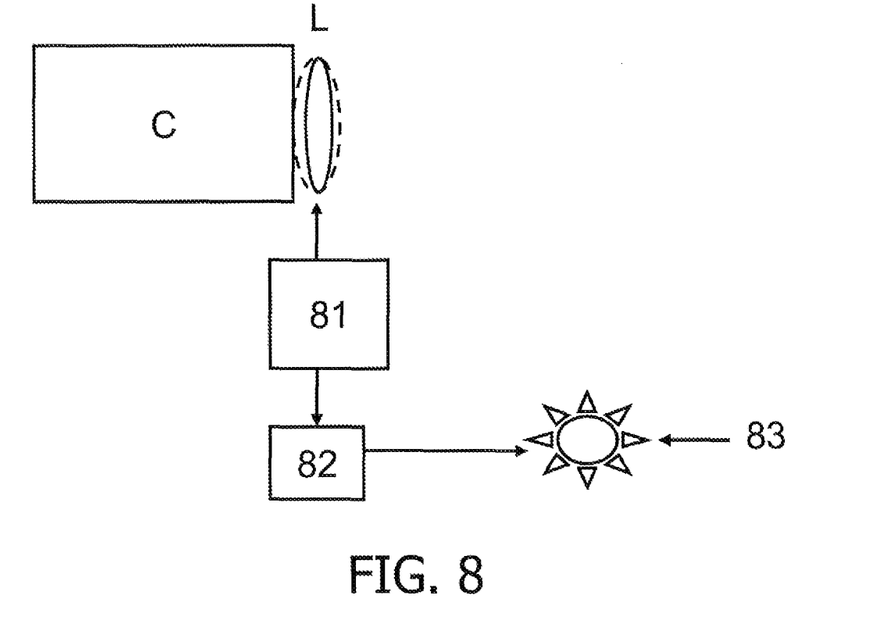
FIG. 8 illustrates a camera system according to the invention.
Figure 9:
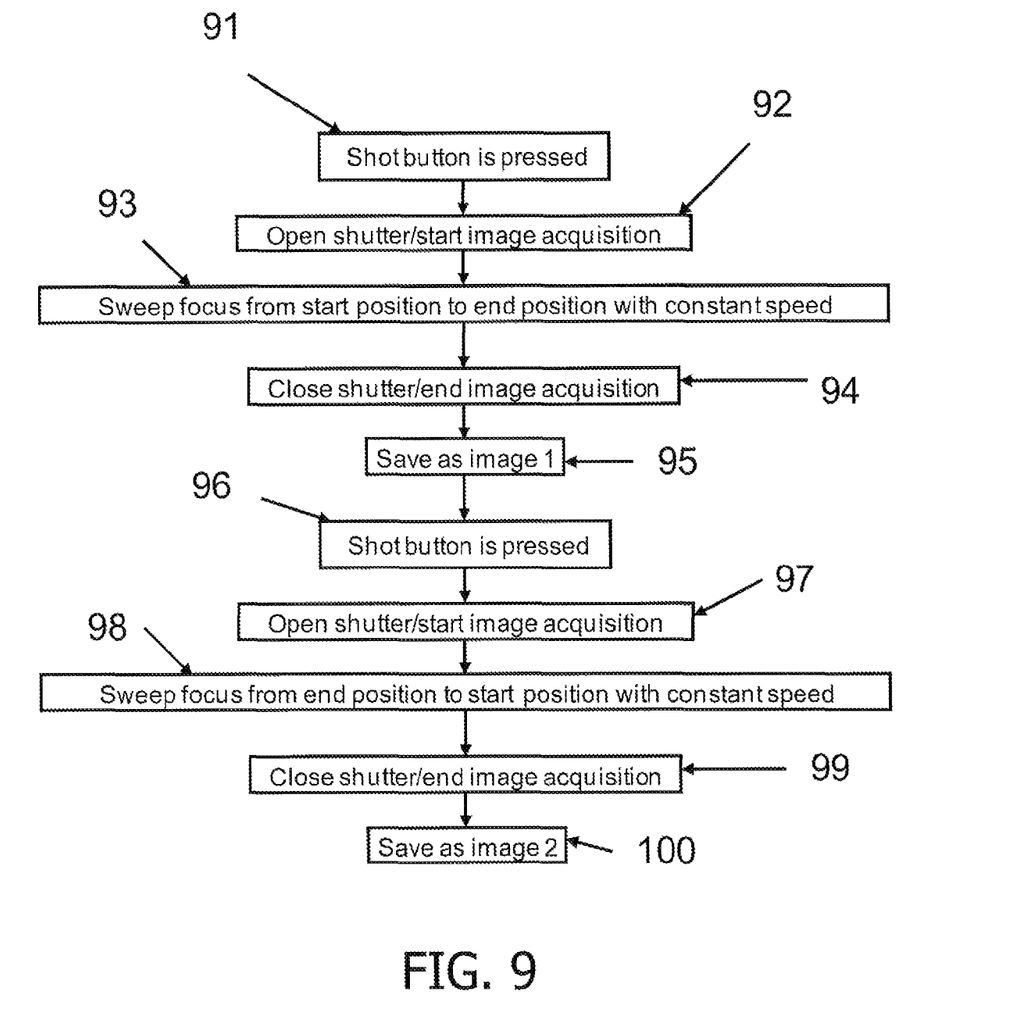
FIG. 9 illustrates acquiring two images with differently modulated exposure intensity.

FIGS. 8 and 9 illustrate such an embodiment. In FIG. 9 the sweep speed is the same and constant for the acquisition of images 1 and 2. Apart from renumbering the steps, the only difference with the scheme of FIG. 7 is that the focus is swept with a constant sweep speed. Taking two images with a constant sweep speed will not, unless something special is done offer the possibility to extract depth information.

However, as FIG. 8 illustrates the system has a camera C, a lens L of which the focal length can be regulated to sweep the focus. The system has means 81 to regulate the focal length of the lens. In fact, cameras with auto/focus already have means to sweep the focus to find the right focal distance. The system also regulates via, means 82, the illumination of the image through lamp 83. The strength of illumination is regulated such that it is differently modulated during step 93 than during step 98. For instance, the illumination is regulated such that it increases, for instance exponentially, but could also be a different function of time, from beginning to end of a sweep. The result is that, for step 93, and thus for image 1, the illumination is most pronounced near the end position of the sweep, while for step 98, and thus for image 2, the illumination is most pronounced near the start position.

To state it differently, if the start position corresponds to nearby objects being in focus, and the end position to far away objects being in focus, in image 1 far away objects will be more highlighted, while in image 2 near objects will be more highlighted.

Figure 10:
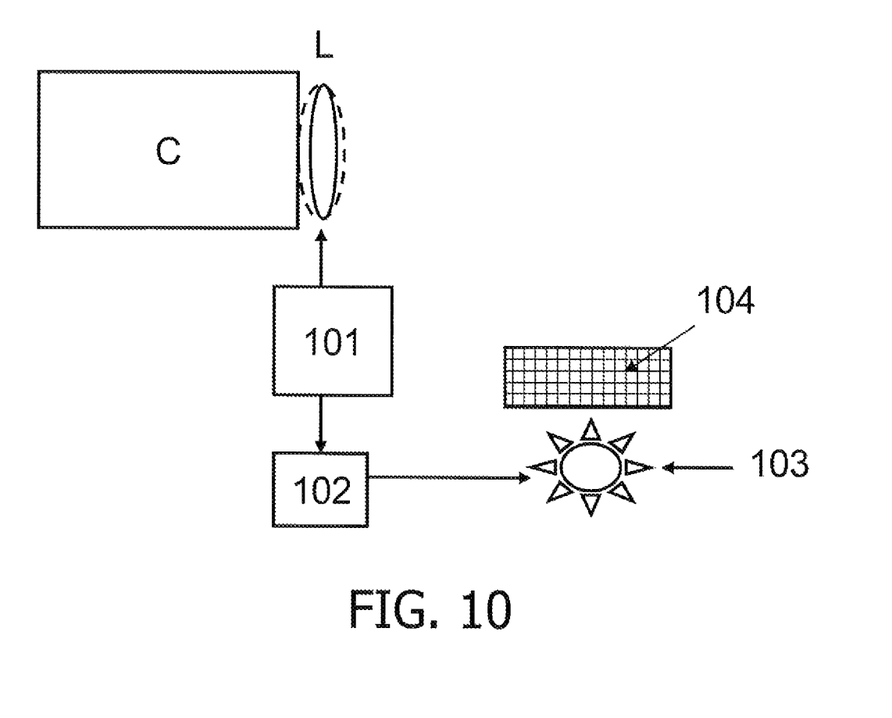
FIG. 10 illustrates a further example of a camera system according to the invention.

FIG. 10 illustrates a variation on the scheme of FIG. 8. In front of the lamp 103 a means 104 is provided to impart a pattern to the illumination.

Figure 11:
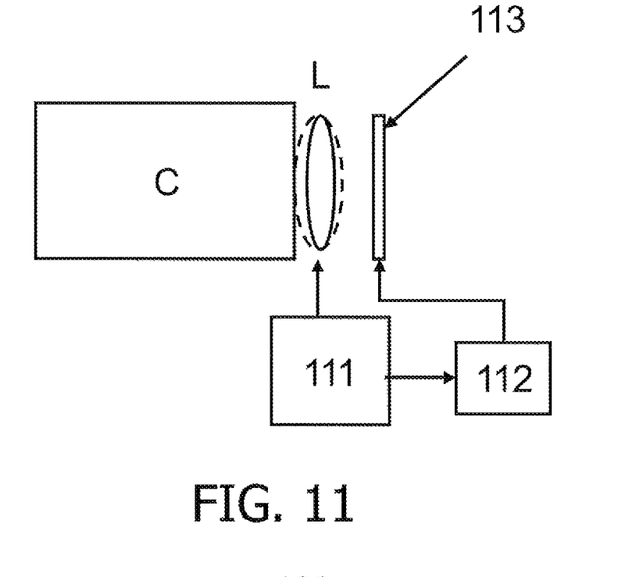
FIGS. 11 and 12 illustrate further examples of a camera system according to the invention.

FIG. 11 shows a variation on the scheme of FIG. 8. Instead of regulating the illumination, the light falling into the lens L is regulated by means of a plate 113 with a transparency that can be changed. Such a set-up can for instance be used for outdoor scenes in which the illumination is due to sources that cannot be controlled, such as the sun.

Figure 12:
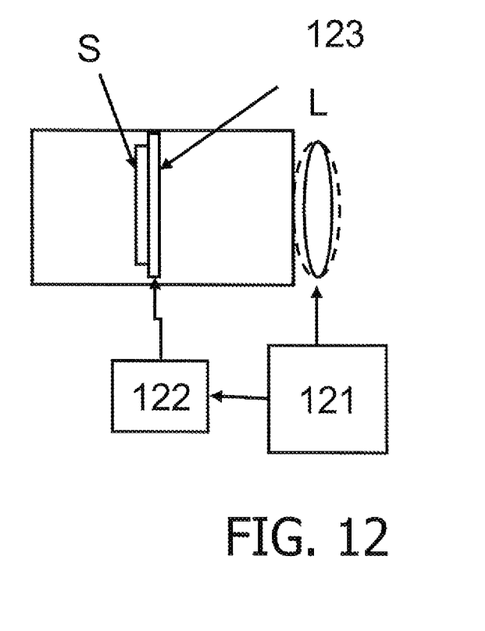

Such means with controllable transparency may also be used between the lens and the sensor, in FIG. 12 schematically illustrated by means 123 in front of sensor S.

The previous examples have all shown examples in which the two images are taken consecutively. Although many preferred embodiments operate in such manner, it is not the only way of performing the invention.

The system of FIG. 12 can be arranged to allow the two images to be taken simultaneously by using means with controllable transparency wherein the transparency for each pixel or line or part of the image can be controlled and the transparency is controlled such that for, e.g. odd and even lines the transparency goes from low to high during the focal sweep for one of the set of lines and from high to low during the focal sweep for the other set of lines. Of course, this scheme can be further refined by for instance a checker board approach wherein the pixels are divided into two groups where the two groups form a checker board over the sensor.

The two images are then taken simultaneously.

A variation on this scheme is to use a single lens and a splitting mirror which splits the image into two images, which images are sent to different sensors, whereby for each of the sensors a means with controlled transparency is provided and the transparency of the plates is modulated during the focal sweep, for one of the sensors decreasing during the focal sweep, for the other increasing during the focal sweep.

Taking two images one after the other is advantageous in case the change in the image between the images is small. The advantage is that the two images can be correlated very accurately. Taking two images simultaneously provides for an additional step of making sure that the positions on the sensors correspond. However, such a set-up is advantageous in case an image is to be taken of a relatively fast moving object.

Having taken the two images with differently modulated exposure during the focus sweep, the next step is to be taken and that is to extract the depth information from the two images.

The scene depth map can be calculated from a pair of differently modulated focus sweep images. Moreover the depth map (and its error bound) can be calculated, by means of a calibration, directly from the pair of images, which is an advantage over commonly used 'probabilistic' methods, such as estimating depth by depth of focus, which can give completely wrong depth maps or even cannot distinguish between two different depths.

Figure 13A:
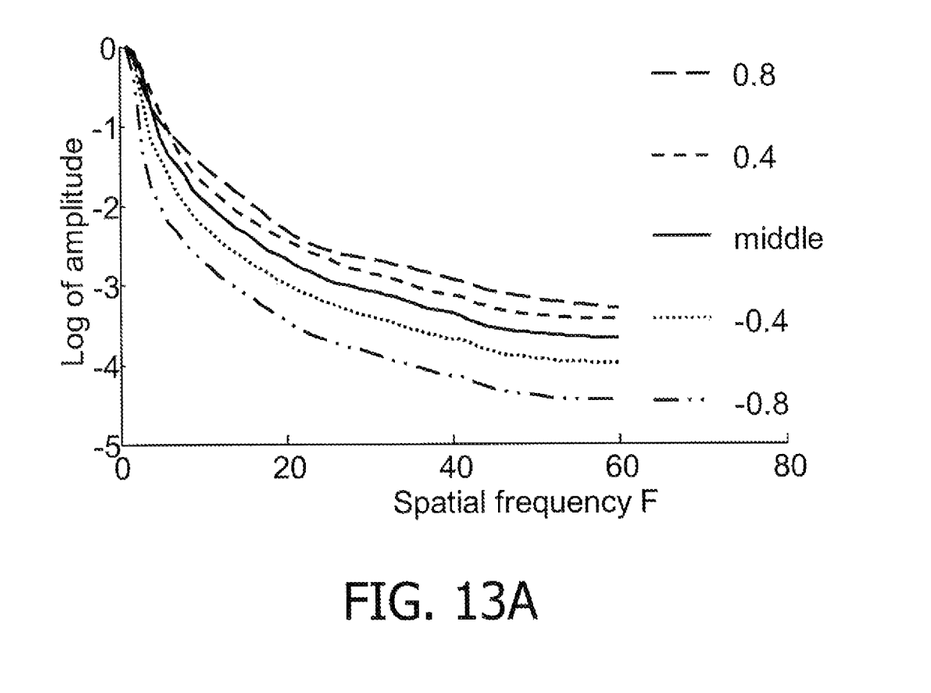
FIGS. 13A and 13B illustrate the frequency distribution of the amplitude over spatial frequencies for respectively increasing and decreasing exposure intensity during the focal sweep.
Figure 13B:
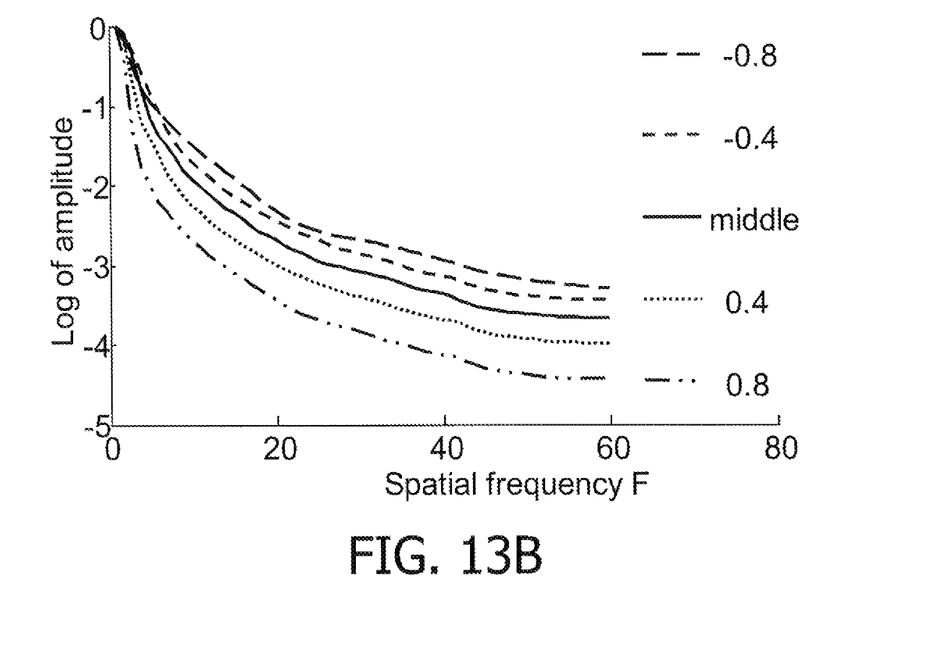

To illustrate this, FIGS. 13A and 13B give measurements of the spatial frequency components, i.e. a spectrum plot, for a number of situations wherein for FIG. 13A an increasing exposure is used, and for FIG. 13B a decreasing exposure is used. An increasing exposure means that, at the end of the sweep the exposure is highest, whereas at the beginning of the sweep the exposure is lowest, a decreasing exposure means the opposite.

The lines give the distribution for images taken of an object. The legend provides for the position of the object. The denotation "middle" means that the object was, during the sweep, situated at the middle of the sweep range. If the object is in the middle position and in focus an object at either end of the focal sweep range experiences approximately 100% of the maximal blurring effect. A number 0.8 means that the object was situated at a position near the end of the focal sweep where, when said object is in focus an object at the "middle" position experiences 80 percent of the maximal blurring effect, a number −0.8 corresponds to an object being positioned symmetrically near the beginning of the focal sweep.

FIG. 13A shows that for increasing exposure intensity during the focal sweep, the high spatial frequency components are largest for objects that are positioned near the end of the sweep range, and lowest for objects positioned at the other end of the focal sweep. At the beginning of the focal sweep the intensity is low, so objects positioned near the beginning of the focal sweep have only limited high frequency components (they receive only a limited amount of light), near the end of the focal sweep the exposure intensity is high and the objects have large high frequency components.

FIG. 13B shows that the opposite is true for a decreasing exposure during the focal sweep.

Figure 14A:
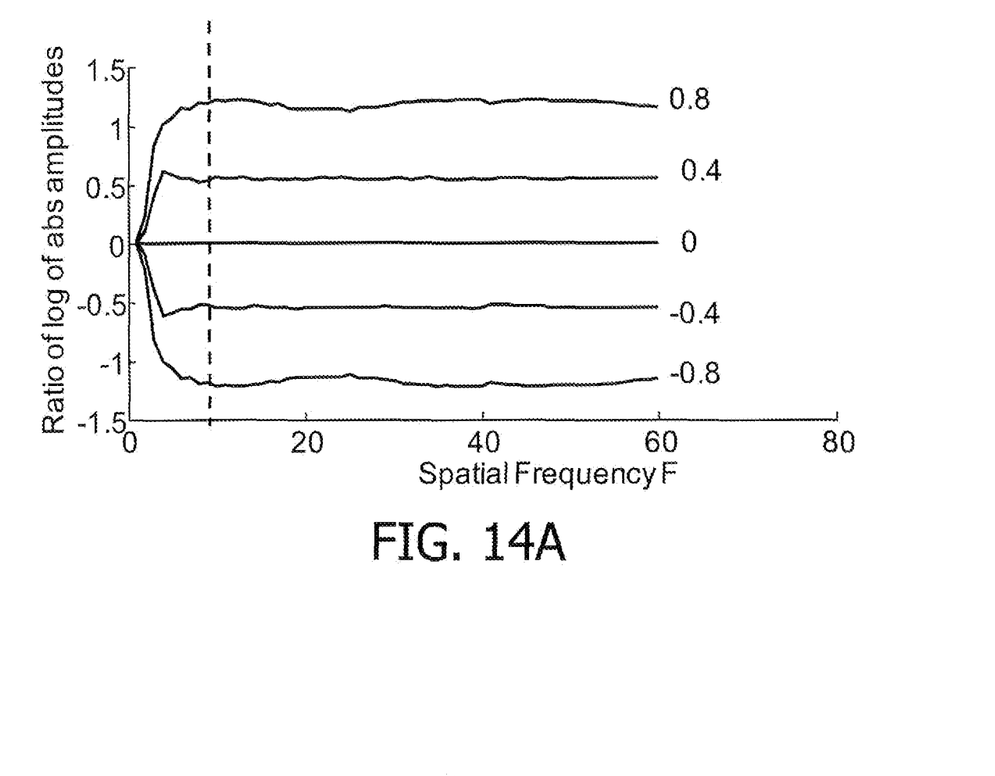
FIG. 14A illustrates the ratio of the amplitudes as a function of spatial frequency.

Dividing the outcome of graph 13A by the outcome of graph 13B provides a graph as shown in FIG. 14A. As a function of the spatial frequency (given on the horizontal axis) the log of the ratio of absolute amplitude varies significantly for small spatial frequencies, but is, for spatial frequencies higher than the ones schematically indicated by the vertical dotted line, more or less, within relatively small margins, a constant. One can see that in high-frequency part this ratio is almost frequency invariant, i.e. it depends only on the position in the focal sweep range and thus on the distance of the lens to the object. The shape of the sweeping focus kernel is scale invariant.

FIG. 14A roughly provides an indication of the frequency percentage, at which the ratio becomes flat. High spatial frequencies correspond to spatial frequencies with a spatial wavelength smaller than approximately 10% of the blur kernel size. Thus, if the blur kernel has, on the sensor a size of 60 pixels, a highest spatial frequency is 60 cycles/kernel, i.e. details with a spatial wavelength of one pixel, the lowest is an overall detail, i.e. 1 cycle/kernel. The cut-off between high spatial and low spatial frequency lies, in this example, around 10% of the blur kernel size, i.e. around 6 cycles/kernel, details of around 6 to 10 pixels and smaller. As stated above the blur kernel itself is scale invariant, so all measures scale with the effective blur kernel size. The cut-off lies, somewhat dependent on the used modulation, approximately around 6 to 10% of the blur kernel size. It is remarked that for a particular camera system the graph of FIG. 14A can be calculated to find the transition between high and low spatial frequencies, i.e. the frequency range above which the ratio is a good measure for the depth.

Figure 14B:
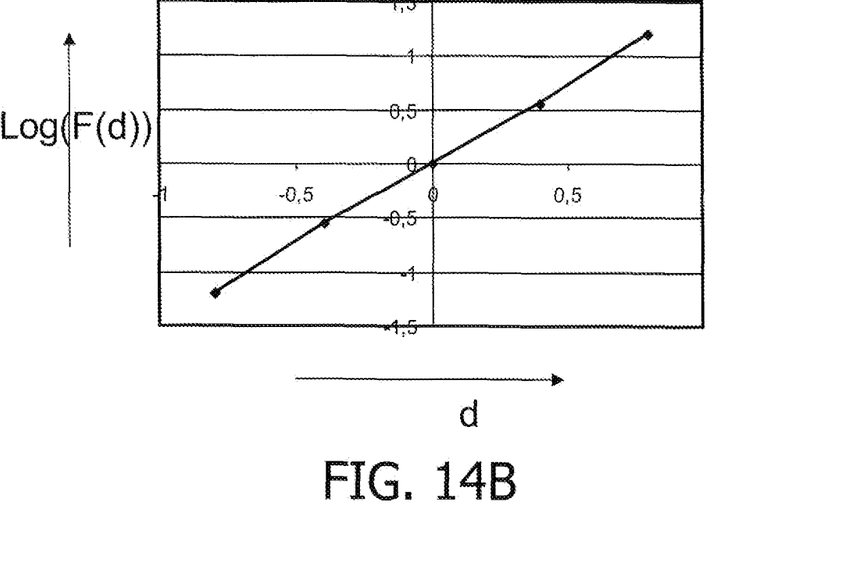
FIG. 14B illustrates the ratio of the amplitudes as a function of position in the focal sweep.

FIG. 14B plots the log of this spatial frequency invariant ratio R on the vertical axis as a function of the position P of the object in the focal sweep on the horizontal axis.

It is seen that this ratio is a function of the position of the object in the focal sweep range, i.e. of the distance d to the lens.

The high frequency energy of the image obtained with a sweeping focus camera with, for this example, exponentially increasing exposure can be approximated, according to Parseval equality, as $$HF(\text{Image1}) \approx \int (F_H(\omega) F_{SF1}(\omega)(F_{Image}(\omega) + F_{N1}(\omega)))^2 d\omega,$$

where $F_H(\omega)$ is the Fourier transform of the high-pass filter, $F_{SF1}(\omega)$ is the Fourier transform of sweeping focus blurring kernel, corresponding to increasing exposure $F_{image}(\omega)$ is the Fourier transform of texture and $F_{N1}(\omega)$ is the Fourier transform of the additive noise in image 1. The high frequent energy of the image obtained with a sweeping focus camera with exponentially decreasing exposure can be approximated, similarly, as $$HF(\text{Image2}) \approx \int (F_H(\omega) F_{SF2}(\omega)(F_{Image}(\omega) + F_{N2}(\omega)))^2 d\omega,$$

where $F_{SF2}(\omega)$ is the Fourier transform of sweeping focus blurring kernel, corresponding to decreasing exposure and $F_{N2}(\omega)$ is the Fourier transform of the additive noise in image 2.

As shown in FIG. 14A, for high frequencies, we have $$(F_{SF1}(\omega))^2 \approx F(d)(F_{SF2}(\omega))^2,$$

where F(d) is the ratio between the instant illumination intensities at distance d. Note that F(d) is a function which depends on the object-camera distance, and it does not depend on frequency ω. If the sweep is exponential then F(d) is also exponential and the Log(F(d)) is a linear function of d, as shown in FIG. 14B. Thus for the ratio between the high frequent energies of the image we will have $$\frac{HF(\text{Image1})}{HF(\text{Image2})} \approx F^2(d) \frac{\int (F_H(\omega) F_{SF1}(\omega)(F_{Image}(\omega) + F_{N1}(\omega)))^2 d\omega}{\int (F_H(\omega) F_{SF1}(\omega)(F_{Image}(\omega) + F_{N2}(\omega)))^2 d\omega}$$

$$\approx F^2(d) \frac{S + \eta_1}{S + \eta_2},$$

Where S is the high-frequent energy of the texture, and $\eta_1$, $\eta_2$ are the noise energies at first and the second acquisition. If the signal from the texture is much higher the noise level, i.e. S>>$\eta_1$, $\eta_2$, or if the energy of the noise in both images are approximately equal, then $$\frac{HF(\text{Image1})}{HF(\text{Image2})} \approx F^2(d) \frac{S + \eta_1}{S + \eta_2} \approx F^2(d).$$

Thus taking the ratios of the high frequency components provides a reliable estimate of distance to objects. Experiments ID shows that the proposed method also works for objects with variable distance to the camera when the convolutions are limited to a small window around specific image coordinate. The above example is given for an exponentially changing sweep speed. However, approximately the same results are obtained for linearly changing sweep speeds.

Preferably the sum of the two exposures is a constant.

If this condition holds the two images can be summed to provide (by filtering with a reverse point spread function) an image is an all-in-focus image wherein all parts of the image are sharp.

So taking the middle of the sweep range to be x=0, it preferably holds that f(x)+f(−x)=constant, where f(x) and (f(−x) are the exposure intensities at either side of the middle of the sweep range.

This can relatively easily be obtained if one uses a constant sweep speed and changes the illumination or transparency during the sweep.

For exponential sweep one will get the amplitude of high frequencies which follows exp(Ax)+exp(−Ax) where x=0 corresponds to the middle of the sweeping range.

exp(Ax)+exp(−Ax) is close to a constant only for the small range of x, depending also on the exponential behaviour, i.e. the value of A.

In the filtered summed image of two exponential exposures there will be a slight over-sharpening of the objects at the boundaries of the sweeping range, in other words objects in the foreground and background will be somewhat sharper than objects in the middle of the sweeping range.

Both exponential and linear exposure modulations are close to the equation at x=0, but none of them is optimal, for the complete range, albeit linear modulations providing generally a more constant sharpening than exponential exposure modulations.

Since the exposure is inversely proportional to the sweeping speed, the linear or exponential exposure preferably starts at low value>0 corresponding to the maximal possible sweeping speed. In other embodiments (modulated light source of global shutter) the exposure can start with 0.

Figure 15:
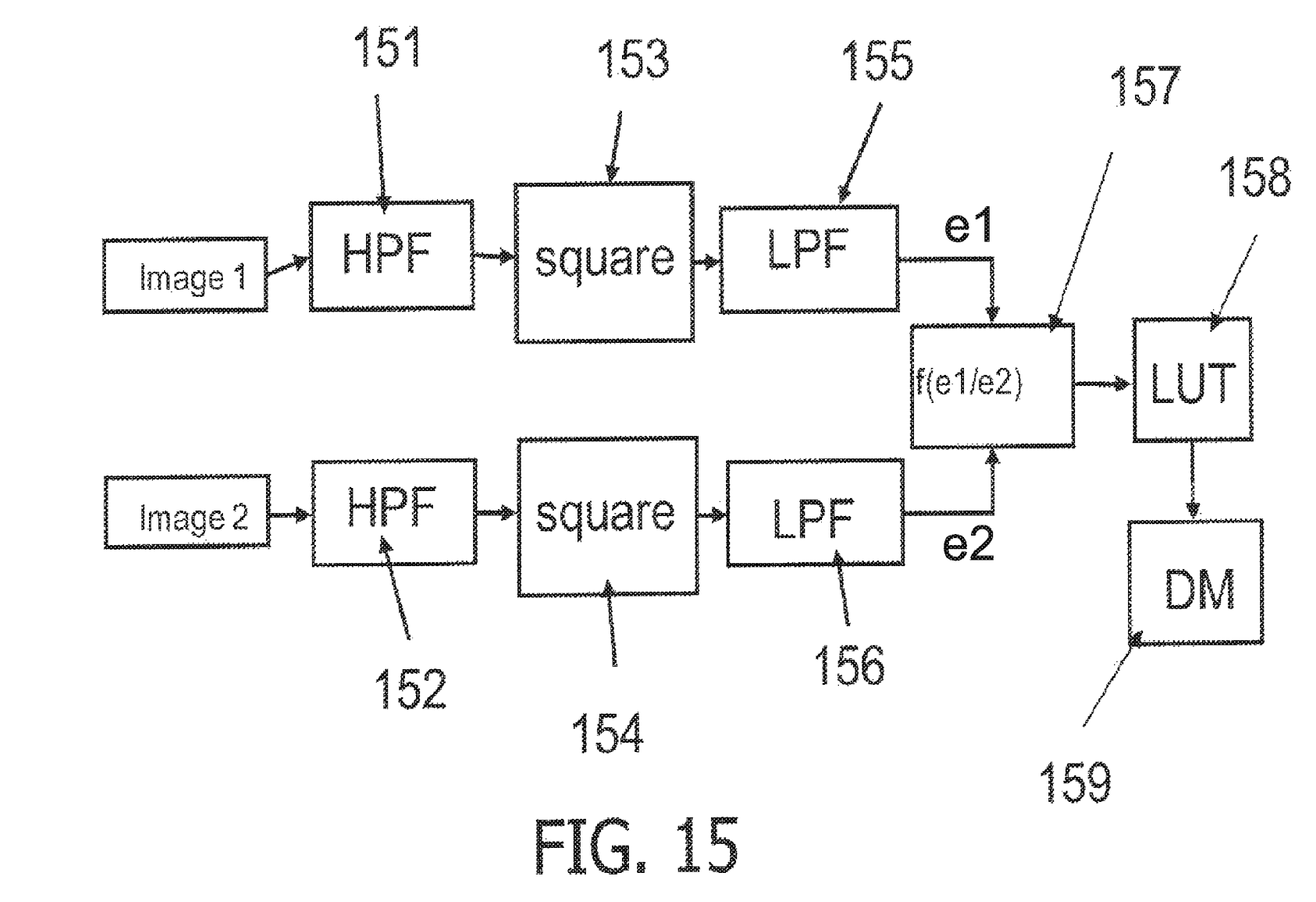
FIG. 15 illustrates schematically calculating distances from image data taken for two images with differently modulated exposure intensity during the focal sweep.

FIG. 15 illustrates this schematically. Each image, image 1 and image 2, is convoluted with a spatial high pass filter in steps 151, 152, the so filtered values are squared (or taken the absolute values thereof) in steps 153 and 154, these values are low pass filtered in steps 155 and 156. The outcome are the high frequencies energies e1 (for image 1) and e2 (for image 2). These are used to make a depth map DM in step 159. In an example corresponding to FIGS. 14A, 14B, 15A and 15B, the log of the ratio e1/e2 is taken, this is used to look up a depth value in step 158 in a look up table LUT, and this provides the distance to the lens and thus the depth map. Observe that for exponential sweeps the log of the ratio e1/e2 gives a linear function of the object distance d, and therefore the LUT can be simplified to a linear mapping. It will be clear that, where the depth map is a function of the ratio of the high frequency energies, various methods may be used, such as for instance using a LUT to directly find the depth map DM from the ratio e1/e2, where the sweep is different from the exponential, and where the distance can be expressed as a function of e1/e2, directly calculate the depth map from the ratio e1/e2.

The present invention also includes a computer program product which provides the functionality of any of the methods according to the present invention when executed on a computing device.

Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution such as any machine readable signal storage medium. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer. The computer may be integrated in an image taking device, such as a camera, or the camera may take images and store them to be processed later or transmit the image data, by wire or wireless to a computer in which computer the image data is processed to extract a depth map.

Other variations can be envisaged within the claims.

For instance, in the example the difference in modulation of exposure is that in one of the images the exposure increases, whereas in the other it decreases. This is a preferred embodiment, since this allows a high accuracy by taking the ratio of the high frequency components. However, one could also modulate one image and not modulate the other. If one then takes the ratio, similar to what is schematically illustrated in FIG. 14B, one would still get the same outcome, i.e. the ratio is dependent on the distance only, but with only half the value, and thus reduced accuracy.

In the embodiments only two images are taken. This is not a restriction on the invention in its broadest sense, more than two images, each with different modulation, can be taken. For instance, one could use two images with modulated exposure and one with constant exposure. Or, one could take four images, two with decreasing and two with increasing exposure, but with different rates of increase. This would add redundancy to the system, enabling meaningful depth data to be obtained, even if one of the data taking channels would fail.

In short the various aspects of the invention can be described by:

Two or more images are taken wherein during the image taking a focal sweep is performed. The exposure intensity is modulated during the focal sweep and done so differently for the images. This modulation provides for a watermarking of depth information in the images. The difference in exposure during the sweep watermarks the depth information differently in the images. This is one aspect of the invention. By comparing the images a depth map for the images can be calculated. This is another aspect of the invention. A camera system of the invention has a lens and a sensor and a means for performing a focal sweep and means for modulating the exposure intensity during the focal sweep. Modulating the exposure intensity can be done by modulating a light source or the focal sweep or by modulating the transparency of a transparent medium in the light path.

The camera system according to the invention is, in preferred embodiments, provided with means to set the middle of the sweep range and to set the extent of the sweep range. This allows to gather more efficiently 3D information for a particular range of depths around a particular distance from the lens.

The invention claimed is:

1. A method of recording images, said method comprising the steps:
   acquiring at least a first image and a second image using a lens and a sensor;
   during the acquiring of each of the at least first and second images, conducting one or more focal sweeps, each of the one or more focal sweeps corresponding to a change in distance between the lens and the sensor, over a focal sweep range;
   differently modulating exposure intensity as a function of time during the one or more focal sweeps for each of the at least first and second images, wherein the exposure intensity in the at least first and second images is modulated as a function of time during the one or more focal sweeps in such manner that the modulation from beginning to end of one of the focal sweeps in one of the at least first and second images is reversed with respect to the modulation from beginning to end of the other of the focal sweeps in the other of the at least first and second images, the exposure for a sum of the at least first and second images being constant over the focal sweeps; and recording the acquired at east first and second images.

2. The method of recording images as claimed in claim 1, wherein the exposure intensity is modulated by modulating as a function of time during the one or more focal sweeps the speed of the one or more focal sweeps, said modulation being different for the at least first and second images.

3. The method of recording images as claimed in claim 1, wherein the exposure intensity is modulated by time modulation of a light source during the one or more focal sweeps, said time modulation being different for the at least first and second images.

4. The method of recording images as claimed in claim 1, wherein the exposure intensity is modulated by time modulation of a transparency of a transparent means in a light path during the one or more focal sweeps, said time modulation being different for the at least first and second images.

5. The method of recording images as claimed in claim 4, wherein the at least first and second images are acquired through the lens and the transparent means is provided on an object side of the lens.

6. The method of recording images as claimed in claim 4, wherein the at least first and second images are acquired through the lens and recorded by the sensor and the transparent means is provided in the light path between the lens and the sensor.

7. The method of recording images as claimed in claim 1, further comprising obtaining 3D information from the at least first and second images by comparing high-frequency information in the at east first and second images, and calculating a depth map from the comparison.

8. The method of recording images as claimed in claim 1, wherein the modulation is based on using an exponential acceleration throughout the one or more focal sweeps.

9. The method of recording images as claimed in claim 1, wherein the modulation is based on using a constant acceleration throughout the one or more focal sweeps.

10. A computer program product comprising program code stored on a non-transitory computer readable medium for performing a method, when run on a computer, comprising:

acquiring at least a first image and a second image using a lens and a sensor;

during the acquiring of each of the at least first and second images, conducting one or more focal sweeps, each of the one or more e focal sweeps corresponding to a change in distance between the lens and the sensor, over a focal sweep range;

differently modulating exposure intensity as a function of time during the one or more focal sweeps for each of the at least first and second images, wherein the exposure intensity in the at least first and second images is modulated as a function of time during the one or more focal sweeps in such manner that the modulation from beginning to end of one of the focal sweeps in one of the at least first and second images is reversed with respect to the modulation from beginning end of the other of the focal sweeps in the other of the at least first and second images, the exposure for a sum of the at least first and second images being constant over the focal sweeps; and recording the acquired at least first and second images.

11. A camera system comprising:

a lens and a sensor used to acquire at least a first image and a second image;

means to conduct one or ore focal sweeps, each corresponding to a change in distance between the lens and the sensor, during the acquisition of each of the at least first and second images;

means to modulate the exposure intensity during the one or more focal sweeps as a function of time for each of the at least first and second images, the means to modulate comprising means with controllable transparency disposed between the lens and the sensor and for controlling a transparency for the at least first image from lower to higher while simultaneously for controlling the transparency of the at least second image from higher to lower; and a storage medium to record the acquired at least first and second images.

12. The camera system as claimed in claim 11, further comprising a light source and the means to modulate comprises means to time modulate the intensity of the light source during the one or more focal sweeps.

13. The camera system as claimed in claim 11, further comprising a transparent plate on an object side of the lens or between the lens and the sensor wherein the means to modulate comprises means to time modulate the transparency of the transparent plate during the one or more focal sweeps.

14. The camera system as claimed in claim 11, wherein the lens and the sensor are arranged to acquire the at least first and second images simultaneously during a single focal sweep and the means to modulate modulate the exposure intensity differently for the at least first and second images.

15. The camera system as claimed in claim 11, wherein the lens and the sensor are arranged to acquire the at least first and second images sequentially during sequential focal sweeps, the means to modulate modulate the exposure intensity differently for the at least first and second images.

16. The camera system as claimed in claim 11, further comprising a splitting mirror that provides the at least first and second images and first and second means with controllable transparency, the first and second means with the controllable transparency disposed respectively between the lens and the sensor and the lens and another sensor, for controlling a transparency of the first means with the controllable transparency for the at least first image from lower to higher while simultaneously for controlling a transparency for the second means with the controllable transparency for the at least second image from higher to lower.

17. The camera system as claimed in claim 11, wherein the modulation is based on using an exponential acceleration throughout the one or more focal sweeps.

18. The camera system as claimed in claim 11, wherein the modulation is based on using a constant acceleration throughout the one or more focal sweeps.

* * * * *